US012802310B2

(12) United States Patent
Spinat et al.

(10) Patent No.: US 12,802,310 B2
(45) Date of Patent: Nov. 17, 2026

(54) METHOD FOR GENERATING A 3D IMAGE OF A HUMAN BODY PART

(71) Applicant: THERAPANACEA, Paris (FR)

(72) Inventors: Quentin Spinat, Paris (FR); Despoina Ioannidou, Paris (FR); Kumar Shreshtha, Paris (FR); Ayoub Oumani, Paris (FR); Alexandre Cafaro, Paris (FR); Olivier Teboul, Paris (FR); Nikos Paragios, Paris (FR)

(73) Assignee: THERAPANACEA, Paris (FR)

( * ) Notice: Subject to any disclaimer, the term of this patent is extended or adjusted under 35 U.S.C. 154(b) by 227 days.

(21) Appl. No.: 18/635,312

(22) Filed: Apr. 15, 2024

(65) Prior Publication Data

US 2024/0346714 A1 Oct. 17, 2024

(30) Foreign Application Priority Data

Apr. 14, 2023 (EP) .................................... 23168117

(51) Int. Cl.
*G06T 12/00* (2026.01)

(52) U.S. Cl.
CPC .......... *G06T 12/00* (2026.01); *G06T 2210/41* (2013.01)

(58) Field of Classification Search
CPC ...... G06T 12/00; G06T 2210/41; G06T 17/00
See application file for complete search history.

(56) References Cited

PUBLICATIONS

Bayesian Image Reconstruction, Marinescu et al 2021 (Year: 2021).*
3D-StyleGAN, Hong et al 2021 (Year: 2021).*
Search Report issued on Aug. 24, 2023, in corresponding European Application No. 23 16 8117, 3 pages.
Marinescu et al., "Bayesian Image Reconstruction using Deep Generative Models", Workshop on Deep Generative Models and Downstream Applications, Dec. 8, 2020, 26 pages.
Hong et al., "3D-StyleGAN: A Style-Based Generative Adversarial Network for Generative Modeling of Three-Dimensional Medical Images", Springer Nature Switzerland AG 2021, S. Engelhardt et al. (Eds.): DGM4MICCAI 2021/DALI 2021, LNCS 13003, Sep. 25, 2021, 11 pages.
Sun et al., "An Adversarial Learning Approach to Medical Image Synthesis for Lesion Removal", arxiv.org, Cornell University, 201 Olin Library Cornell University Ithaca, NY 14853, Oct. 25, 2018, 15 pages.
Daras et al., "Intermediate Layer 1-16 Optimization for Inverse Problems Using Deep Generative Models", arxiv.org, Cornell University, 201 Olin Library Cornell University Ithaca, NY 14853, Feb. 15, 2021, 21 pages.
Li et al., "Causal Image Synthesis of Brain MR in 3D", arxiv.org, Cornell University Library, 201 Olin Library Cornell University Ithaca, NY 14853, Mar. 25, 2023, 11 pages.

* cited by examiner

*Primary Examiner* — Jianxun Yang
(74) *Attorney, Agent, or Firm* — Maier & Maier, PLLC

(57) ABSTRACT

A method for generating a 3D image of a human body part including: train a generative network based on a library of human body part 3D scans of reference to obtain a generative model; make a 3D scan of a studied human body part; define a subset of the studied 3D scan by excluding the content of an area; optimize a latent variable for minimizing a distance between the defined subset and an image of a subset generated by the generative model from the latent variable; generate a complete 3D image of the studied human body part with the generative model using the optimized latent variable.

14 Claims, 9 Drawing Sheets

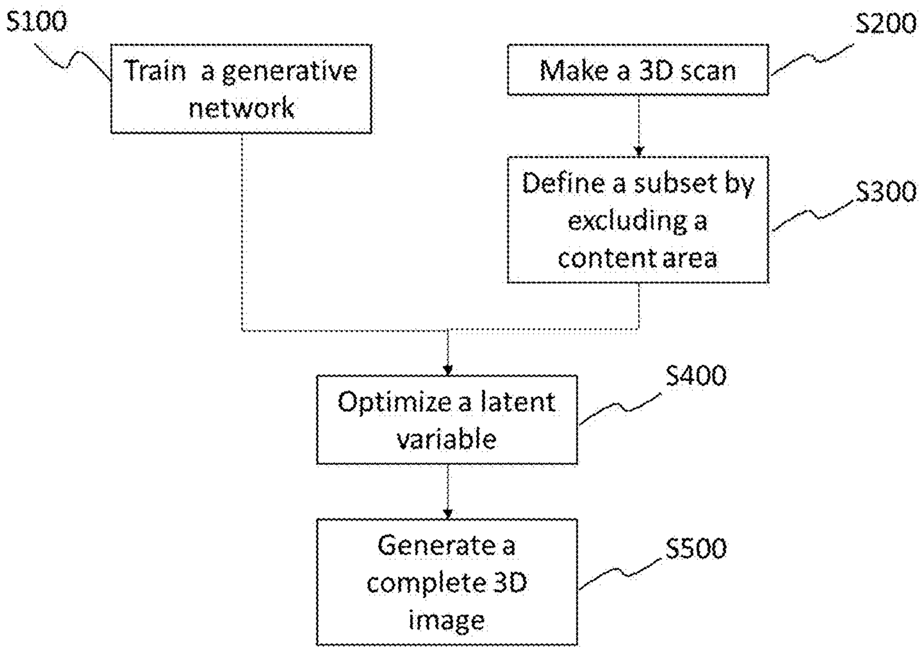
FIG. 1
FIG. 2
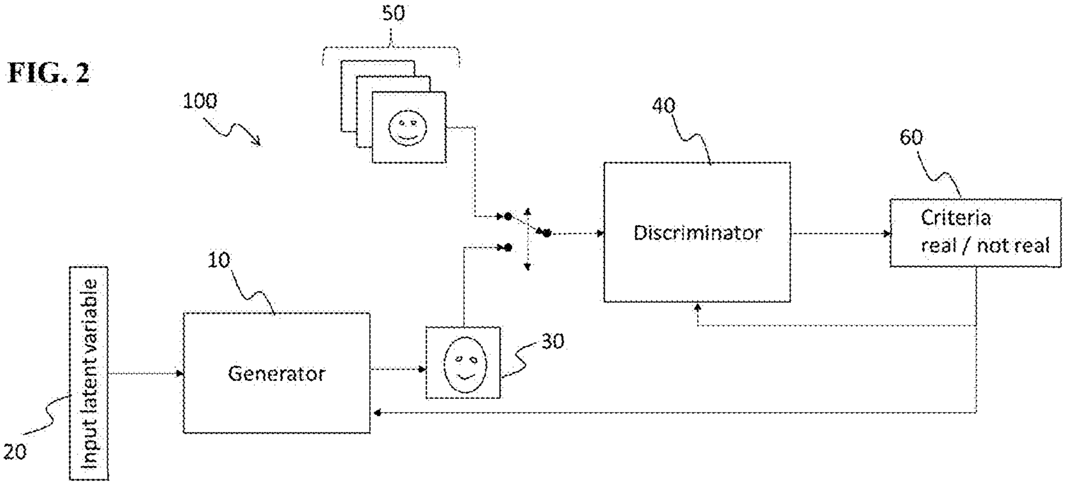

METHOD FOR GENERATING A 3D IMAGE OF A HUMAN BODY PART

FIELD

The present invention relates to image processing and more specifically to a method for generating a 3D image of a human body part, for example an organ like a brain.

BACKGROUND

Medical imaging is used in order to help diagnose diseases or medical problems. Depending on the region to observe, the nature and the depth of the tissues, different imaging apparatuses can be used, such as Magnetic Resonance Imaging (MRI) or Computed Tomography (CT) scan, for example.

To improve the analysis and the diagnostic, different analyzing processes can be applied. For example, images and scans can be processed to generate 3D images of the human body part observed.

The opportunity to have images, and more specifically 3D images, that show the evolution, particularly the longitudinal evolution (i.e., temporal evolution) of a part of a patient's body, from a healthy condition to the appearance of a pathology, would introduce significant advantages to diagnose and make prognostics.

Unfortunately, when patients consult or make their first medical imaging, the pathology may already be there, which prevents comparison with the healthy condition of the patient, the body part being already altered by the pathology.

In other cases, the previous medical images were done by different imaging apparatuses that gave images with different formats or different resolutions preventing imaging comparison with the former condition of the patient. Thus, even if the patient was healthy or just began to be affected by a pathology at the time of the first medical images, the comparison between the first and the new images of the body part is not possible because one or more areas observed lack of resolution, are missing, or are already altered by the pathology.

Another problem that may occur is the presence of artifacts on the medical images which may prevent good observation and analysis of the images. Such artifacts appear for example during MRI when a patient has a metallic element in the observed area like a tooth crown or a surgical pin or metal plate.

Finally, some technologies propose to compare the medical images of the patient with a bank of images coming from healthy persons. These technologies are not easy to implement and not conclusive because of the multiple physiological differences between human beings (different skulls sizes and shapes, differences depending on the age, the sex, or the origins of the persons . . . ).

A purpose of the present invention is to provide a method for generating a complete 3D image of the studied human body part that overcomes these problems.

SUMMARY

To this end, the present invention relates to a computer-implemented method for generating a 3D image of a human body part comprising:

- train a generative network based on a library of human body part 3D scans of reference to obtain a generative model;
- make a 3D scan of a studied human body part;

- define a subset of the studied 3D scan by excluding the content of an area;
- optimize a latent variable for minimizing a distance between the defined subset and an image of a subset generated by the generative model from the latent variable;
- generate a complete 3D image of the studied human body part with the generative model using the optimized latent variable.

Such complete 3D image of the studied human body part makes possible a comparison with the 3D scan of the studied human body part with itself in a healthy condition (real or simulated) or with former images of this body part when the excluding content of an area is an area altered by a pathology, or an area that cannot be compared to former images because low resolution, or because the images were not correctly converted in 3D and/or may comprise artifacts, for example.

In other words, the present invention relates to computer-implemented method for generating a non-affected 3D image of a human body part of a patient from an affected 3D image of said human body part of said patient, said method comprising:

- receiving a trained generative model configured to receive a latent variable as input and to generate a non-affected 3D image as output, wherein said generative model is obtained by training a generative network using a library of human body part 3D scans of reference;
- receive said affected 3D image of a patient comprising at least one portion of said human body part, wherein said affected 3D image comprises at least one affected area;
- define a subset of said affected 3D image by excluding the content of at least one affected area from said affected 3D image;
- generating an optimal latent variable from minimizing a distance between said defined subset of the affected 3D image and a candidate subset; wherein said candidate subset is defined by excluding the content of said at least one affected area from a candidate image generated by said generative model fed with a candidate latent variable;
- generate a non-affected 3D image of the human body part of said patient with the generative model using said optimal latent variable as input.

According to other advantageous aspects of the invention, the method includes one or more of the following features, taken alone or in any technically possible combination:

- the generative network is the generator of a generative adversarial network;
- the generative adversarial network uses 3D convolutions;
- the distance is the Euclidean distance over all the voxels of the subsets;
- the latent variable is a latent vector of dimension N and the latent variable is optimized on a mapped space of dimension N of distributions of the vectors used during training;
- Gaussian noise is added and optimized during the optimization of the latent variable as a second set of latent variables;
- regularization terms are added to the Euclidean distance;
- the regularization terms comprise a cosine similarity prior over the latent variable, a normal distribution prior over the latent variable and a normal distribution prior over noise;
- the regularization terms have each one a contributive weight for the optimization of the latent variable;

said at least one affected area comprises at least one of: a lesion, an artifact, a resolution lower than a predetermined threshold;

the contributive weights are defined in a preliminary step following the training of the generative network;

the step of definition of the contributive weights comprises:

taking a 3D scan of reference of the human body part;

defining a subset of said 3D scan by excluding an area;

optimizing the latent variable for minimizing a distance between the defined subset and an image of a subset generated by the generative model from the latent variable;

generating a complete 3D image of the studied human body part with the generative model using the optimized latent variable;

comparing the generated complete 3D image with the 3D scan of reference; and.

reiterating, by modifying the contributive weights, the optimization and the generation steps until the comparison satisfies predefined criteria;

contributive weights are found by comparing a left, respectively right, half-human body 3D scan with the image of the left, respectively right, half-human body part 3D scan generated by the generative model from the right, respectively left, half-human body part 3D scan;

the generative network is trained by using a first library of T1 MRI scans or a second library of T2 MRI scans; and/or the human body part is a brain;

The invention also relates to a device comprising a processor configured to carry out a method as previously described, a computer program product comprising instructions which, when the program is executed by a computer, cause the computer to carry out the method as previously described and a non-transitory computer-readable storage medium comprising instructions which, when executed by a computer, cause the computer to carry out the steps of the method of the present invention.

The present disclosure further pertains to a non-transitory program storage device, readable by a computer, tangibly embodying a program of instructions executable by the computer to perform a method for generating, compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM, an EPROM (Erasable Programmable ROM) or a Flash memory, a portable CD-ROM (Compact-Disc ROM).

Definitions

In the present specification, the following terms have the following meanings:

The terms "adapted" and "configured" are used in the present disclosure as broadly encompassing initial configuration, later adaptation or complementation of the present device, or any combination thereof alike, whether effected through material or software means (including firmware).

The term "processor" should not be construed to be restricted to hardware capable of executing software, and refers in a general way to a processing device, which can for example include a computer, a microprocessor, an integrated circuit, or a programmable logic device (PLD). The processor may also encompass one or more Graphics Processing Units (GPU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

"human body part" refers to a part of a human body, for example:

a member (e.g., head, trunk, arm, leg . . . );

a system (e.g., cardiovascular, circulatory, digestive, endocrine, locomotor, nervous, reproductive, respiratory, sensory, urinary . . . );

an organ (e.g., brain, heart, spleen, stomach, intestines, colon, bladder, pancreas, kidney, liver, lungs, thyroid, genitals . . . ); or a tissue (muscle, nervous, connective, epithelial . . . ).

"voxel" refers to the volume of a pixel in a 3D image or scan.

"T1 MRI scan" refers to T1-weighted (T1W) image which is a basic pulse sequence in magnetic resonance imaging (MRI) and depicts differences in signals based upon intrinsic T1 relaxation time of various tissues. T1 corresponds to "spin-lattice"; that is, magnetization in the same direction as the static magnetic field.

"T2 MRI scan" refers to T2-weighted (T1W) image which is a basic pulse sequence in magnetic resonance imaging (MRI) and depicts differences in signals based upon intrinsic T2 relaxation time of various tissues. T2 corresponds to "spin-spin", that is, magnetization in the transverse direction to the static magnetic field.

An "affected area" refers to an area (e.g., region) of the image that deviates from the normal or expected appearance due to the present of artifacts, low resolution, or pathology (ies). Affected regions in the context of MRI image processing could include areas of the brain showing anomalies such as tumors, lesions, hemorrhages, or abnormalities in tissue structure. Additionally, regions that are impacted by artifacts such as motion artifacts, susceptibility artifacts, or partial volume effects may also be considered affected regions. These could manifest as distorted or blurred areas in the images.

"Datasets" are collections of data used to build an ML mathematical model, so as to make data-driven predictions or decisions. In "supervised learning" (i.e. inferring functions from known input-output examples in the form of labelled training data), three types of ML datasets (also designated as ML sets) are typically dedicated to three respective kinds of tasks: "training", i.e. fitting the parameters, "validation", i.e. tuning ML hyperparameters (which are parameters used to control the learning process), and "testing", i.e. checking independently of a training dataset exploited for building a mathematical model that the latter model provides satisfying results.

BRIEF DESCRIPTION OF THE DRAWINGS

The invention will be better understood with the following description and the attached figures given only as examples, in which:

FIG. 1 is a schematic representation of a first embodiment of the method according to the invention.

FIG. 2 is a schematic representation of a generative adversarial network (GAN).

DETAILED DESCRIPTION

Figure 3:
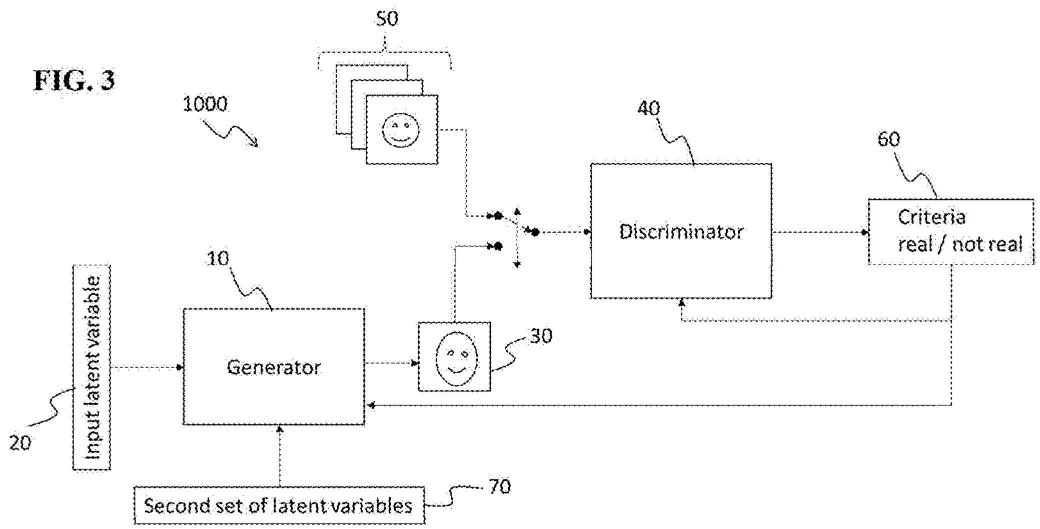
FIG. 3 is a schematic representation of a particular generative adversarial network (StyleGAN).

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein may represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

A method for generating a 3D image of a human body part according to a first embodiment is shown in FIG. 1.

The method comprises a step S100 wherein a generative network is trained to obtain a generative model, based on a library of human body part 3D scans (i.e., 3D images obtained from a MRI or CT scanner) of reference.

The library of human body part 3D scans of reference can be a library of healthy human body part 3D scans, or a library of good quality human body part 3D scans (i.e., having high resolution, with no artifacts, without visible pathologies or of insignificant size for example). In other words, the library of human body part 3D scans of reference may comprise a plurality of 3D images acquired from a plurality of individuals, each image comprising at least one portion of the human body part. Notably, these plurality of 3D images presents no alteration, wherein in present invention with alteration is refers to any alteration that may be caused by the imaging acquisition and/or post-processing, such as lack of resolution, imaging artifacts, or an anatomical abnormality such as a deviation from standard anatomy of the body part pathological or not (e.g., list of anatomical structures or landmarks described in medical guidelines or scientific articles). This library is used as training dataset for the training of the generative network.

Independently, the method may also comprise:

- a step S200 wherein a studied human body is scanned in 3D to obtain a first 3D image of the studied human body part or preferably, wherein the 3D image of the studied human body is received from a database; and
- a step S300 wherein a subset of the studied 3D scan is defined by excluding the content of an area.

The method also comprises a step S400 wherein a latent variable is optimized for minimizing a distance between the defined subset and an image being a subset of an image (i.e., candidate image) generated by the generative model from the (candidate) latent variable.

The method also comprises a step S500 wherein a complete (i.e., non-affected) 3D image of the studied body part is generated with the generative model using the optimized latent variable (i.e. optimal latent variable).

The different steps will be described in more detail below.

STEP 100 Training a Generative Network:

Preferably, the generative network is the generator of a generative adversarial network (GAN).

FIG. 2 represents an example of generative adversarial network (GAN). Globally, the aim of a GAN is to learn how to generate new data (in the present embodiment new 3D images) having the same statistic as a training set of data.

The GAN 100 comprises:

- a generator 10 which generates a fake (i.e., synthetic) 3D image 30 starting from an input latent variable vector 20;

a discriminator 40, which tries to determine if its input 3D image is a fake image 30 or a real image coming from a library of real images 50.

The training (tuning) of the GAN may be performed using the above cited training dataset (i.e., library of human body part 3D scans of reference). The tune of the generator 10 and of the discriminator 40 is done depending on the result given by the discriminator and a criterion real/not real 60. Multiple iterations of the generation, discrimination and tuning are required to obtain an operational and robust generator 10.

Advantageously, to generate a complete 3D image of the studied human body part, the step of training the generative network S100 can only be done once to produce the generative model.

Preferably, the generative network is trained by using a first library of T1 MRI scans or a second library of T2 MRI scans.

It is to be noted that a generative model obtained by training a generative network with the first library of T1 MRI scans will be used to generate a complete T1 MRI image of the studied human body part. Respectively, a generative model obtained by training a generative network with the second library of T2 MRI scans will be used to generate a complete T2 MRI image of the studied human body part.

Advantageously, the tuning parameters of the generative network trained with the T1 MRI scans (respectively T2 MRI scans) can be used in the training of the generative network trained with the T2 MRI scans (respectively T1 scans) in order to optimize the training of the second generative network and accelerate it.

FIG. 3 represents another example of generative adversarial network that can be used in step S100, called StyleGAN 1000. StyleGAN also takes a random Gaussian noise as input which is represented as another second set of latent variables 70 in input of the generator 10. This second set of latent variables 70 is related to the addition of noise in this example, however it is not restricted to a random Gaussian noise, another type of noise or variable can be used as the second set of latent variables 70.

According to one embodiment, the generative network is trained with and without noise in order to force the generative network to put the most information possible outside of stochastic details when no noise is added.

According to one embodiment, compared to diffusion models that are known to give impressive generative results, often beating GANs on synthesis quality, GAN does not require the use of longer processes and more computational time in the application to image-to-image translation and image inpainting.

According to one embodiment, the generative adversarial network (GAN) uses 3D convolutions.

STEP 200 Making a 3D Scan of a Studied Human Body Part:

The studied human body part may be imaged by a Magnetic Resonance Imaging (MRI) apparatus or a Computed Tomography (CT) scan for example, and the images are processed to reconstruct a 3D scan. In one embodiment, the method comprises receiving at least one affected 3D image of the patient which may be stored in one or more local or remote database(s). The latter can take the form of storage resources available from any kind of appropriate storage means, which can be notably a RAM or an EEPROM (Electrically-Erasable Programmable Read-Only Memory) such as a Flash memory, possibly within an SSD (Solid-State Disk). More in details, this affected 3D image comprises at least one portion of said human body part and at least one affected area. For example, the human body part may be the brain. In one example, the at least one affected area may be a region abnormal due to the presence of a pathology or due to an acquisition artefact or quality (i.e., low resolution). In one specific example, the human body part may be the brain comprising multiple affected areas comprising lesion characteristic of multiple sclerosis. In another example, the human body part may be one or both lungs comprising multiple affected areas each associated to a lesion (e.g., metastasis).

STEP 300 Defining a Subset of the Studied 3D Scan by Excluding the Content of an Area:

The images (i.e., 3D scans of reference) or the 3D scan (i.e., affected 3D image) may be pre-processed to isolate the tissues or the (organic) anatomical structure that need to be observed. For example, in the case where the studied human body part is a brain, step 200 may comprise a pre-processing step using a brain extraction tool (BET) or preferably a HD-BET (high definition-brain extraction tool), which allows the separation of the brain from non-brain tissues like bones, eyeballs, skin, fat or muscles.

In one embodiment, the 3D scan is resized. For example, the 3D scan can be resampled and co-registered using rigid registration and trilinear interpolation. Then the voxels of the 3D scan can also be resized and the intensity values clipped between a range of values (for example between 0 and 98) and scaled for example between −1 and 1.

In one embodiment, optionally after pre-processing the affected 3D image, the method comprises defining a subset of the studied 3D scan by excluding the content of an area comprises the application of a mask on the 3D scan. In other words, the step 200 comprises computing a mask of the at least one affected area in the affected 3D image. This mask in then used to define the subset of the affected 3D image (i) which correspond to the affected 3D image without the at least one affected area. Masking the affected areas(s) advantageously allows to avoid that the generator tries to reconstruct the affected areas present in the affected 3D image. This is particularly useful in the case of presence of multiple affected areas, such as metastasis or lesions caused by multiple sclerosis.

The application of a mask on the 3D scan may be performed with or without using an inpainting method, in order to exclude imaging artifacts, lesions, tumors, affected regions of the studied human body part, or bad resolution quality area, for example. Advantageously, the use of an inpainting method combined with the use of a mask allows for finer isolation of the area to be excluded, in particular to reduce or even eliminate artifacts.

STEP 400 Optimizing a Latent Variable:

In one embodiment, the latent variable is generated by an optimization process comprising minimizing an Euclidean distance over all the voxels of the subsets. Notably, step S400 comprises generating an optimal latent variable from minimizing a distance between said subset of the affected 3D image and a candidate subset; wherein said candidate subset is defined by excluding the content of said at least one affected area from a candidate image generated by said generative model fed with a candidate latent variable. In other words, the optimal latent variable is generated by a process of optimization based on the minimization of distance between the affected 3D image and a candidate non-affected 3D image, generated from the generative model receiving as input a candidate latent variable, wherein the distance is calculated only on the portions of the affected 3D image and a candidate non-affected 3D image selected by the segmentation mask of step S300 (see FIG. 5).

More in details, step S400 may be configured to generate an optimal latent variable to provide as input to the generative model in further step S500 by mean of a process of latent variable optimization. Said latent variable optimization comprises the generation of one synthetic healthy image (i.e., non-affected 3D image) by feeding with a latent vector the generative model. For the first iteration of the optimization process may be used an initialization latent vector predefined. The same mask used to generate the subset of the affected 3D is applied to the synthetic healthy image to obtain a subset of the synthetic healthy image (i.e., masked synthetic healthy image). Now the distance between the subset of the affected 3D (i.e., masked disease brain image) and the calculated subset of the synthetic healthy image is calculated. The input latent vector (for generating the synthetic healthy image) at each iteration is defined so as to minimize said calculated distance.

In one embodiment, the latent variable is a latent vector of dimension N and the latent variable is optimized on a mapped space of dimension N of distributions of the vectors used during training.

In one embodiment, Gaussian noise is added and optimized during the optimization of the latent variable as a second set of latent variables. Such process enables to control the Gaussian noise, compensate stochastic details and have the best reconstruction possible during step 500.

STEP 500 Generating a Complete 3D Image of the Studied Human Body Part:

According to the GANs represented in FIGS. 2 and 3, step 500 corresponds to put the optimized latent variable into the input of the generator 10 (i.e., fed the optimal latent variable to the trained generative model) which will generate the (complete) non-affected 3D image of the studied human body part of the patent.

Figure 4:
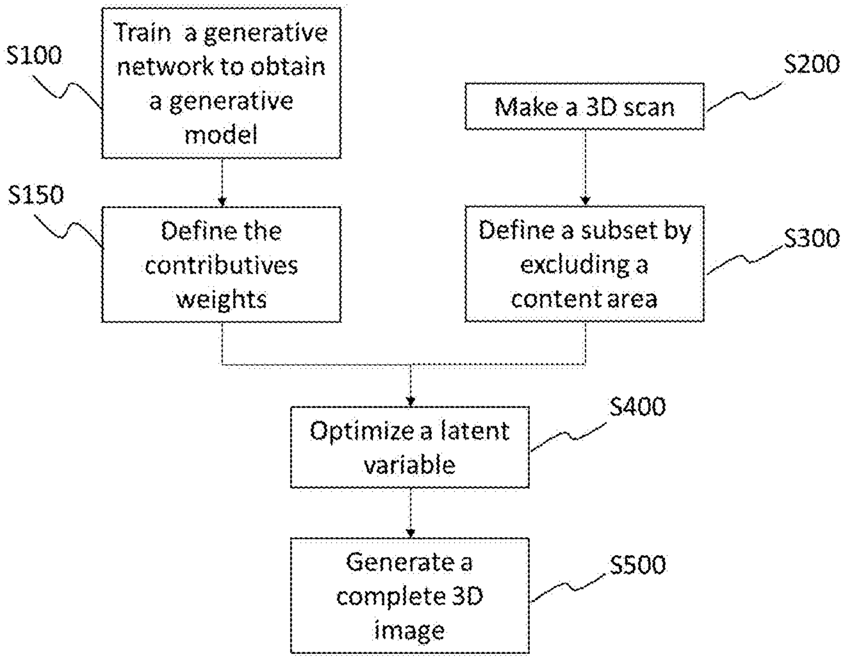
FIG. 4 is a schematic representation of a second embodiment of the method according to the invention.

A second embodiment of the method for generating a complete 3D image of a human body part is shown in FIG. 4. Numerical references that are shared with FIG. 1 illustrates correspond to the same elements.

In this second embodiment:

- the generative network is the generator 10 of a StyleGAN 1000 using 3D convolutions;
- the distance is the Euclidean distance over all the voxels of the subsets, and regularization terms are added to the Euclidean distance.
- the latent variable is a latent vector of dimension N and the latent variable is optimized on a mapped space of dimension N of distributions of the vectors used during training; and
- Gaussian noise is added and optimized during the optimization of the latent variable (S400) as a second set of latent variables.

Preferably, the regularization terms comprise a cosine similarity prior over the latent variable, a normal distribution prior over the latent variable and a normal distribution prior over noise.

Advantageously, regularization terms like the cosine similarity prior will enable to find the Bayesian maximum a posteriori (MAP) estimate over the latent variable that generated the completed 3D image of the studied human body part.

Preferably, the regularization terms have each one a contributive weight for the optimization of the latent variable.

The method further comprises a preliminary step S150 following the training of the generative network S100 wherein the contributive weights are defined.

The step of definition of the contributive weights S150 comprises:

- taking a 3D scan of reference of the human body part;
- defining a subset of said 3D scan by excluding an area;
- optimizing the latent variable for minimizing a distance between the defined subset and an image of a subset generated by the generative model from the latent variable;
- generating a complete 3D image of the studied human body part with the generative model using the optimized latent variable;
- comparing the generated complete 3D image with the 3D scan of reference; and
- reiterating, by modifying the contributive weights, the optimization and the generation steps until the comparison satisfies a predefined criterion.

Advantageously, the contributive weights are found by comparing a left, respectively right, half-body part 3D scan with the image of the left, respectively right, half-body part 3D scan generated by the generative model from the right, respectively left, half-body part 3D scan. This procedure enables to generate a more realistic 3D image of the human body part.

Figure 5:
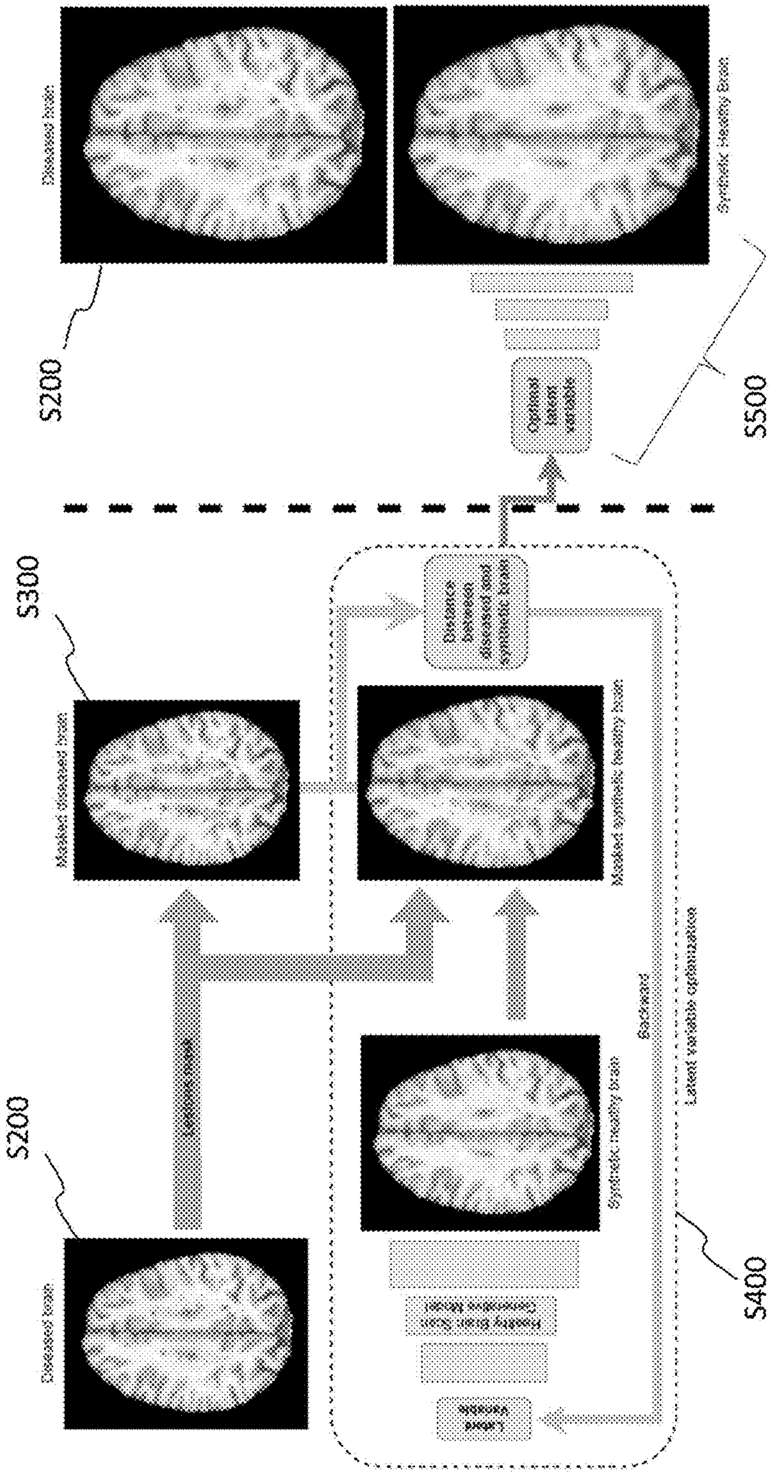
FIG. 5 is a schematic representation of an application of the method for 3D brain generation according to a third embodiment.

Advantageously, the method for generating a 3D image of a human body part is applied to human brains as illustrated in FIG. 5.

In a particular embodiment of the method which is described in further detail below, the method is particularly suitable to help diagnose or prognosticate multiple sclerosis (MS) in a patient's brain.

Multiple Sclerosis (MS) is an inflammatory and demyelinating disease of the central nervous system characterized on MRI in part by T2 hyperintense lesions and accelerated brain volume loss. MS disease is not curable so far for lack of a good understanding of all the pathological processes at play. MS patients are diagnosed by the McDonald Criteria if there is sufficient evidence of demyelination in the central nervous system (CNS) over space and time. Risk of MS is conferred by a number of genetic and environmental risk factors. However these are not precise enough at a patient level to accurately predict individual risks in the healthy population or to enable active disease prevention at a public health level. Additionally, the unpredictable way in which the disease manifests makes it almost impossible to acquire a 'healthy' pre-diseased scan from a patient diagnosed with MS. Presymptomatic MS-specific features of the brain are thus particularly hard to discriminate.

In this particular embodiment, the method enables to generate a synthetic healthy brain 3D MRI scan from a corresponding acquisition from a patient with MS, and more precisely, generate pairs of corresponding MS-damaged and healthy brain scans which may inform the capacity to more comprehensively investigate the longitudinal continuum of MS pathophysiology. More exactly, for a given MS-damaged brain scan, the disclosed embodiment enables to generate the corresponding lesion-free brain scan.

Given that lesions can vary in size from only a few $mm^3$ to more than 100,000 $mm^3$, it is non-trivial to remove these lesions without creating artifacts while also keeping the complex structures of the brain intact. Moreover, the pathology of MS is not limited to lesions. Indeed, new aspects of the disease pathology are becoming visible empirically, such as atrophy and diffuse white matter and gray matter abnormalities. As such, for the most accurate generation of a healthy brain in MS, it may also be necessary to consider removing not only lesions, but also other MS-related abnormalities of the brain, which are disseminated in non-lesional tissue.

As previously described, the method for generating a 3D image of a human body consists of two main steps which, in the case of an application on a brain, can be resumed as:

training a generative model to sample random realistic healthy brain scans by encoding those brain scans information into a latent variable of finite dimension; and given a diseased brain scan, projecting it on the latent space of the healthy brain scan generative model to recover the healthy brain associated with it.

It should be noted that the present embodiments may be implemented in software and/or a combination of software and hardware, for example, it may be implemented by an application-specific integrated circuit ASIC, a general-purpose computer or any other similar hardware device. In one embodiment, the software program of the present invention may be executed through a processor to implement the steps or functions as mentioned above. Likewise, the software program (including relevant data structure) may be stored in the computer-readable recording medium, for example. RAM memory, magnetic or optic drivers or floppy disk or similar devices. Besides, some steps or functions of the present invention may be implemented by hardware, for example, as a circuit cooperating with the processor to execute various steps or functions.

Besides, a part of the present invention may be applied as a computer program product, for example, a computer program instruction, which, when executed by a computer, through the operation of the computer, may invoke or provide the method and/or technical solution of the present invention. However, the program instruction invoking the method of the present invention may be stored in a fixed or mobile recording medium, and/or transmitted through a data stream in broadcast or other signal carrier medium, and/or stored in a working memory of a computer device running according to the program instruction. Here, one embodiment according to the present invention comprises an apparatus that includes a memory for storing computer program instructions and a processor for executing program instructions, wherein when the computer program instructions are executed by the processor, the apparatus is triggered to run the methods and/or technical solutions based on the previously mentioned multiple embodiments of the present invention.

The invention also relates to a device comprising at least one processor comprising a processor configured to carry out the steps of the method as previously described in the embodiments presented above.

The invention also relates to a computer program product comprising instructions which, when the program is executed by a computer, cause the computer to carry out the method as previously described in the embodiments presented above.

EXAMPLES

The present invention is further illustrated by the following examples.

Example 1

Materials and Methods

Dataset and Data Processing

A T1 training dataset is defined to be composed of 4538 T1 weighted MRI scans: 2346 healthy patients brain scans from the OASIS3 dataset, 581 healthy patients brain scans from the IXI dataset, 1112 healthy patients brain scans from the HCP dataset, and 499 healthy patients brain scans from MSPATHS. A T2 training dataset is composed of 2745 T2 weighted MRI scans: 1054 healthy patients brain scans from the OASIS3 dataset [11], 578 healthy patients brain scans from the IXI dataset [1], and 1113 healthy patients brain scans from the HCP dataset. Each of those scans originally have a voxel dimension of 1×1×1 $mm^3$. The scans are skull-stripped using the HDBET framework to extract brain tissues. All volumes are then resampled to a resolution of 3×1×1 $mm^3$ and co-registered using rigid registration and tri-linear interpolation. Finally, volumes are padded to a spatial dimension of 48×224×192, intensity values are clipped between 0 and 98 percentiles and scaled between −1 and 1.

Models Architecture

For the architecture of the generator, it was used an architecture based on a StyleGAN2, changing the 2D convolutions by 3D convolutions, and implementing their optimized modulation/demodulation technique in 3D.

The architecture starts from a block of shape 256×3×14×12 and do four up-sampling changing the channels to 256, 200, 100 and 50 at each one. The same mapping network than in StyleGAN was used: A fully connected neural network with 8 layers of dimension 512 and a latent vector of dimension 512 as input. LeakyReLU was used as activation, with a negative slope coefficient of 0.2. A tanh was used as output activation function. For more details on the architecture, please refer to FIG. 6.

Figure 6:
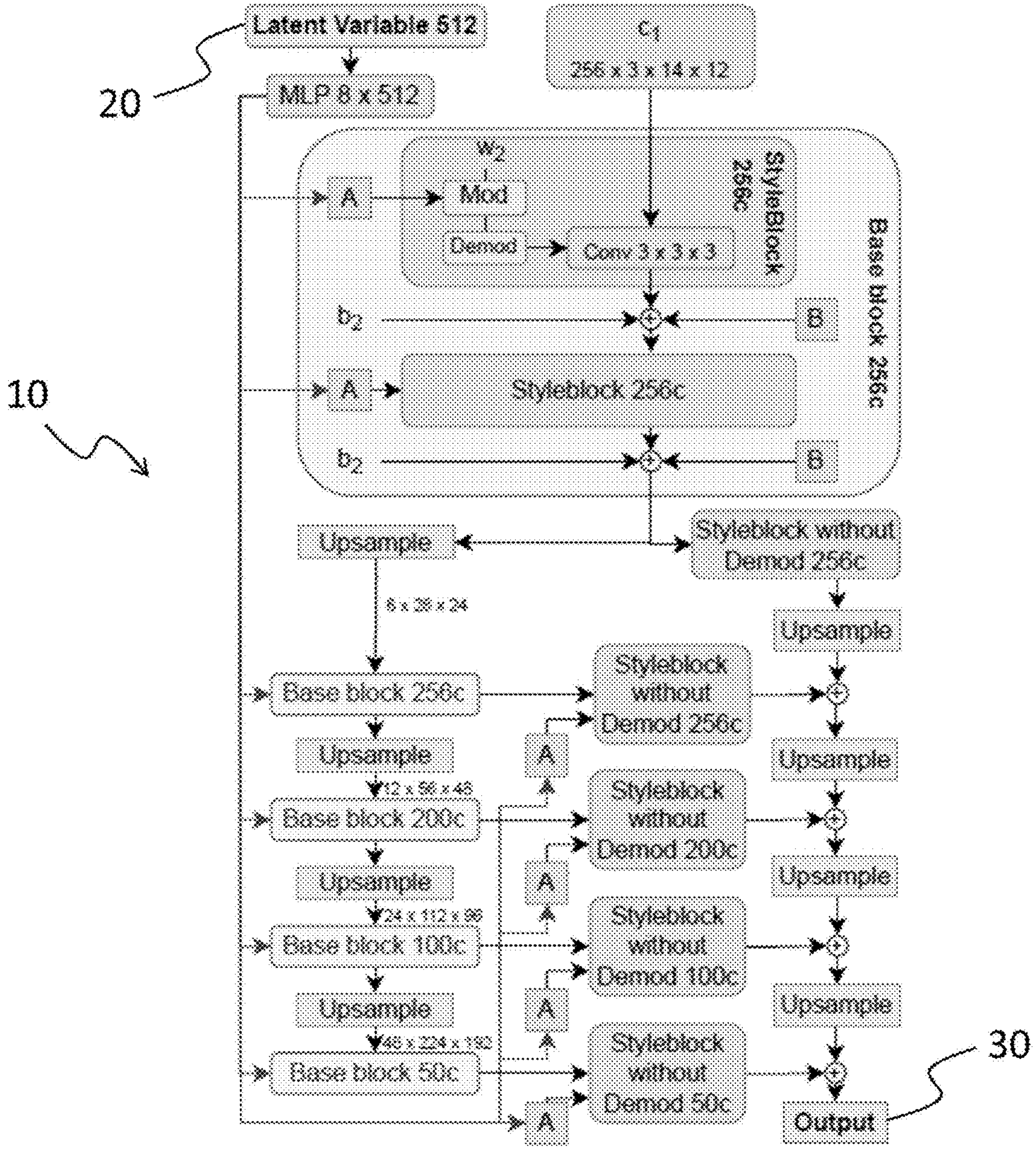
FIG. 6 is a schematic representation of a generator of a 3D StyleGAN architecture that can be used in the third embodiment of the method.

FIG. 6, illustrates in more details the architecture of the generator 10 of the 3D StyleGAN 1000 used in this example, where: A blocks are affine transformations, and B blocks generate Gaussian noise with learnable scale.

The discriminator is a Residual network, as for StyleGAN2, but without the minibatch standard deviation layer. Each 2D convolution is replaced by a 3D convolution, 4 down-samplings are proceeded, and the number of channels at each down-sampling level is mirrored with the number of channels of the generator. Leaky ReLU is used for the activation function, with a negative slope coefficient of 0.2.

Model Training:

A non-saturating logistic loss is used with R1 regularization, style mixing with a probability of 0.9, path length regularization, lazy regularization and adaptive discriminator augmentation with a maximum augmentation probability of 0.2. A probability of 0.2 is added to do a generation without noise during the training in order to force the network to put the most information possible outside of the stochastic details. Initialization is done: all weights are initialized to N(0, 1), biases and noise scaling factors are initialized to zero, except for the biases of the affine transformation layers which are initialized to 1. For data augmentation, only horizontal flips are used, flipping left and right part of the brain. For discriminator augmentation vertical and depthical flips are used, as well as random rotation and scaling, random motion blur and random Gaussian noise.

An Adam optimizer is used, with betas parameters to (0, 0.99), $\epsilon=1e^{-8}$, and a learning rate of $6e^{-5}$ for the generator and discriminator and a learning rate of $1e^{-5}$ for the mapping network. A distributed mixed precision is performed by training over 3 GPUs with a cumulative batch size of 6. It is to be noted that, with a batch size of less than 6, models diverge during training.

For T1 training, the GANs are trained from scratch for 6 weeks. For T2 training, the T1 tuning factors are used and fine-tuned during 1 week.

Healthy Brain Reconstruction

Given a diseased brain, the method of the present invention aims to recover a latent variable from which a healthy brain scan (i.e., non-altered 3D image) can be generated using the generative model described above. It is done by minimizing, over the latent variable, the distance between the input scan and a healthy brain scan generated by the present trained generative model. However, to be sure that the found latent variable stays in learned distribution of healthy brain scan, this minimization needs to be regularized with distribution priors. An exemplary illustration of this process is formalized and explained in detail below.

Formalization

The generator learned a mapping between healthy brain scans and a finite dimension feature space. The mapping that goes from the feature space F to the healthy brain scans space H is denoted G: F→H.

Going the other way around and recover the generator latent variable of the feature space associated with an input healthy brain scan, means to find the function $G^{-1}$: H→F. To this end, $z^* \in F$ is found associated with $h \in H$ by resolving:

$$z^* = \underset{z \in F}{\operatorname{argmin}} d_H(G(z), h) \quad \text{(eq. 1)}$$

where $d_H$ is a distance on the space H.

B is considered as the space of every brain scan. By definition $H \subset B$. If a distance $d_{B,H}$ is defined between B and H, it enables to find z* by solving:

$$z^* = \underset{z \in F}{\operatorname{argmin}} d_{B,H}(G(z), b) \quad \text{(eq. 2)}$$

where $b \in B$.

This is equivalent to finding the healthy brain scan the closest to the brain scan b with respect to the distance $d_{B,H}$. The solution is a projection, more exactly the projection of the input brain scan b (i.e., comprising an alteration) on the healthy brain scans space H with respect to the distance $d_{B,H}$. This defines the function $P_H$: B→H which is the function that returns a healthy brain scan (i.e., non-altered 3D image) corresponding to an input brain scan.

Reconstruction for MS

In the present example, the StyleGAN2 architecture, it takes two sets of latent variables as input. First, latent variable $w \in N_{512}(0, 1)$ goes through the mapping multilayer perceptron, of dimension 512. Before each StyleBlock, this mapped latent variable is fed to an affine transformation before being fed to it (see FIG. 6). It defines the style given to the generation of each StyleBlock. The latent variables fed to each StyleBlock are considered separately by denoting $w_i$ the latent variable that is fed to StyleBlock i.

A global latent variable of dimension $n_{styleblocks} \times 512$ is defined, i.e., $F \sim N_{15 \times 512}(0, 1)$. However, by doing so, it keeps some stochasticity in the inference because of the Gaussian noise added after each StyleBlock. As this stochasticity contains fine-grain details, as well as the complex shapes of the tissues (see FIG. 11), it is interesting to control those Gaussian noises during the generation process and make the generator function completely deterministic in order to get the best reconstruction possible. That is why those Gaussian noises are considered as a second set of latent variable n. This variable has for dimension the sum of the spatial dimension of each StyleBlock input, hence 7×077×672. As a consequence, in this case, $F \sim N_{15 \times 512}(0, 1) \times N_{7 \times 077 \times 672}(0, 1)$.

Figure 7A:
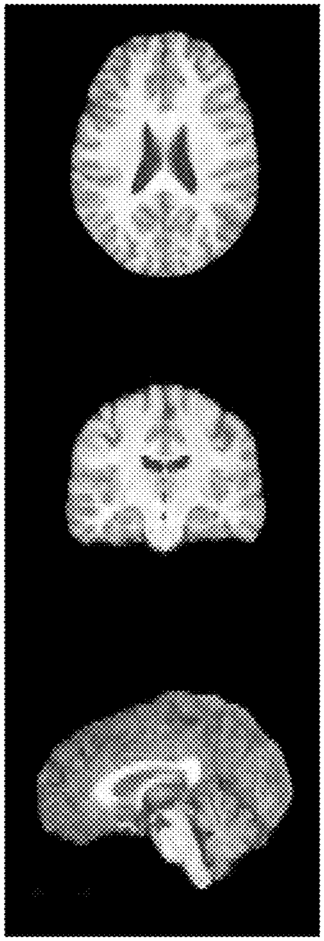
FIGS. 7A to 7C show reconstructions of healthy brain scans from a healthy brain scan with and without noise optimization, using the method according to the third embodiment.
Figure 7B:
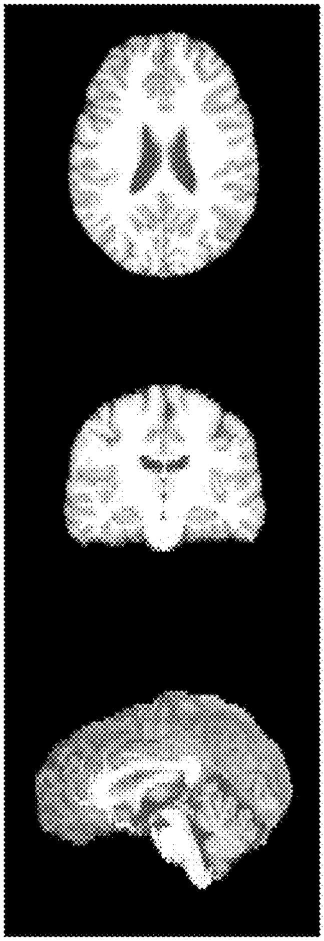
Figure 7C:
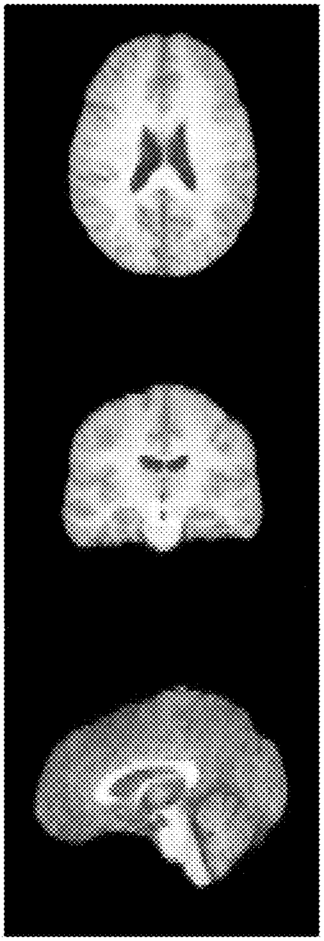

FIGS. 7A-7C show visually that a reconstruction process with optimizing second set of latent variable n gives better results. FIG. 7A represents a reconstruction with noise optimization, FIG. 7B represents the original scan, and FIG. 7C represents a reconstruction without noise optimization.

For distance $d_H$ over H, the Euclidean distance is chosen over all the voxels of the scan. The latent variable is not optimized on its original space $N_{15 \times 512}(0, 1)$, but on its mapped space $N_{15 \times 512}(\mu, \sigma^2)$. μ and σ are chosen by computing the mean and standard deviation of the output of the mapping network over $N_{512}(0, 1)$, ensuring that the $w_i$ vectors lie in the same region as the vectors used during training. A cosine similarity prior is also added that ensures every pair $w_i$ and $w_j$ are roughly colinear. This is supposed to enable to find the Bayesian maximum a posteriori (MAP) estimate over the input latent vector that generated the reconstructed image.

As a consequence, the practical definition of Eq. 1 is:

$$(w^*, n^*) = \underset{w,n}{\operatorname{argmin}} MSE(G(w, n), h) - \lambda_w \sum_i \log N(w_i; \mu_i, \sigma_i) - \lambda_n \log N(n; 0, 1) - \lambda_c \sum_{i,j} \log M\left(\cos^{-1}\left(\frac{w_i w_j^T}{|w_i||w_j|}\right); 0, \kappa\right) \quad \text{Eq. 3}$$

where N(.; μ, σ) is the Normal distribution of mean μ and standard deviation σ, M(.; μ, κ) is the Von Mises distribution of mean μ and scale parameter κ, and the $\lambda_*$ are weights applied to the regularization terms.

Figure 8:
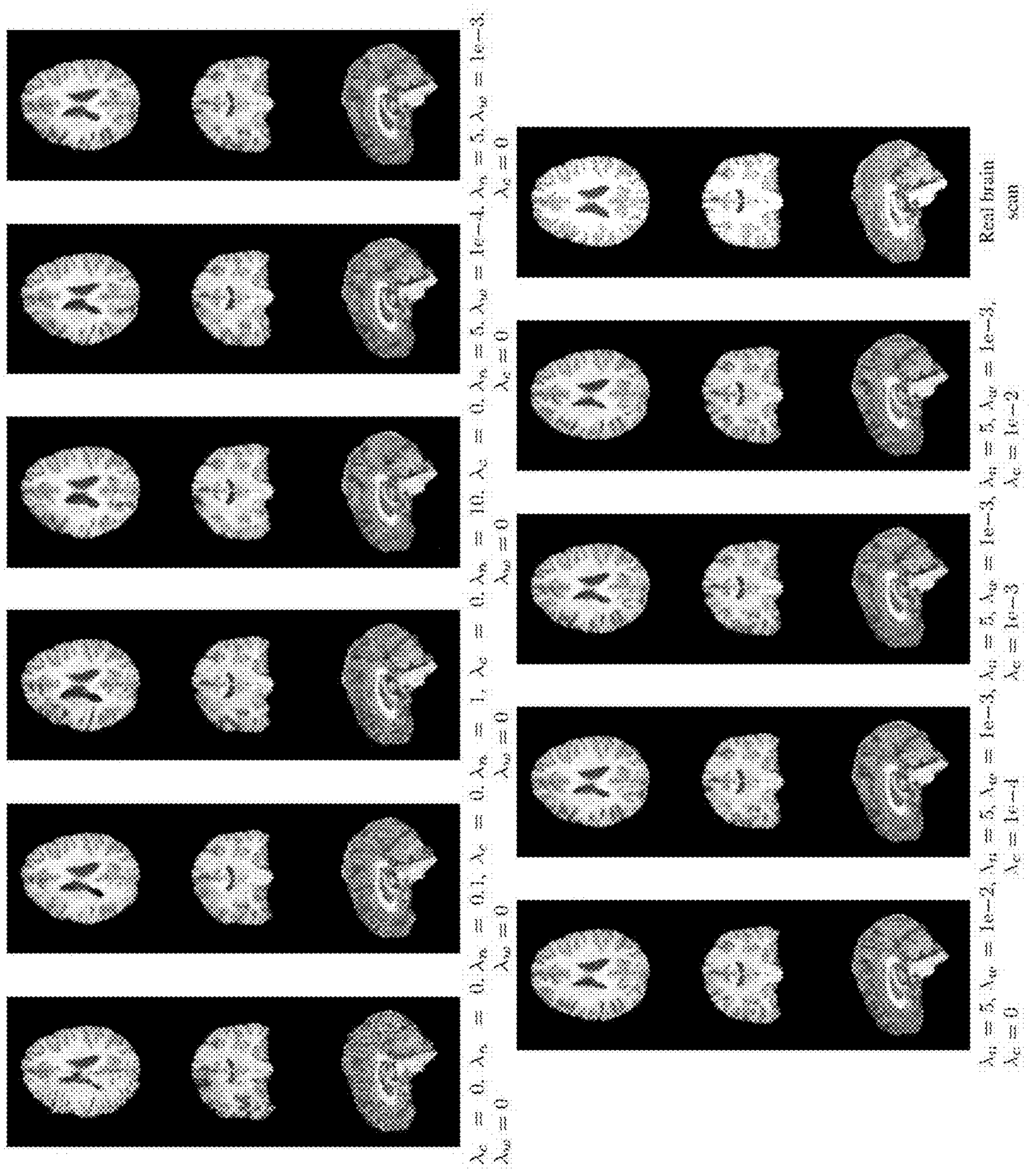
FIG. 8 shows inpaintings of half a healthy brain scan with different regularization terms obtained according to the third embodiment of the method.

In order to find the good values to give to each λ, an entire brain is recovered from a brain scan being half masked. This is done by masking half of G(w, n) and half of h for the computation of the MSE (Mean Square Error) in Eq. 3. The results of this generation are visually analyzed for different set of parameters (grid search) and parameters giving the most realistic generation are chosen. In the present example, $\lambda_w$=1e−3, $\lambda_n$=5 and $\lambda_c$=5e−3. Results are represented in FIG. 8.

With these weights defined, it is important to ensure that $P_H$: H→H is the closest to a projection possible, meaning that means to verify that for every $h \in H$, $P_H(h)=h$. Tab. 3 gives quantitative evaluation of this property, and FIGS. 7A, 7B and 7C provides visual results.

Now that the generator inputs w and n, that sample the healthy brain targeted, can be recovered, the diseased brain scans can be projected on the space of healthy brain scans. To this end, a distance $d_{B,H}$ between a brain scan and a healthy brain scan needs to be defined. For the specific case of MS diseased brains, computing the MSE between lesion voxels would lead the generator to try to reconstruct the lesions of the brain. As a consequence, the MSE is taken between non-lesion tissue of the brain scan, i.e., $d_{B,H}$=MSE ($M_h$(G(w, n), $M_h$(h)), with $M_h$ the function that masks the lesions of h. To this end, a previously computed mask of the lesions is used.

Results

Brain Generation

Figure 9:
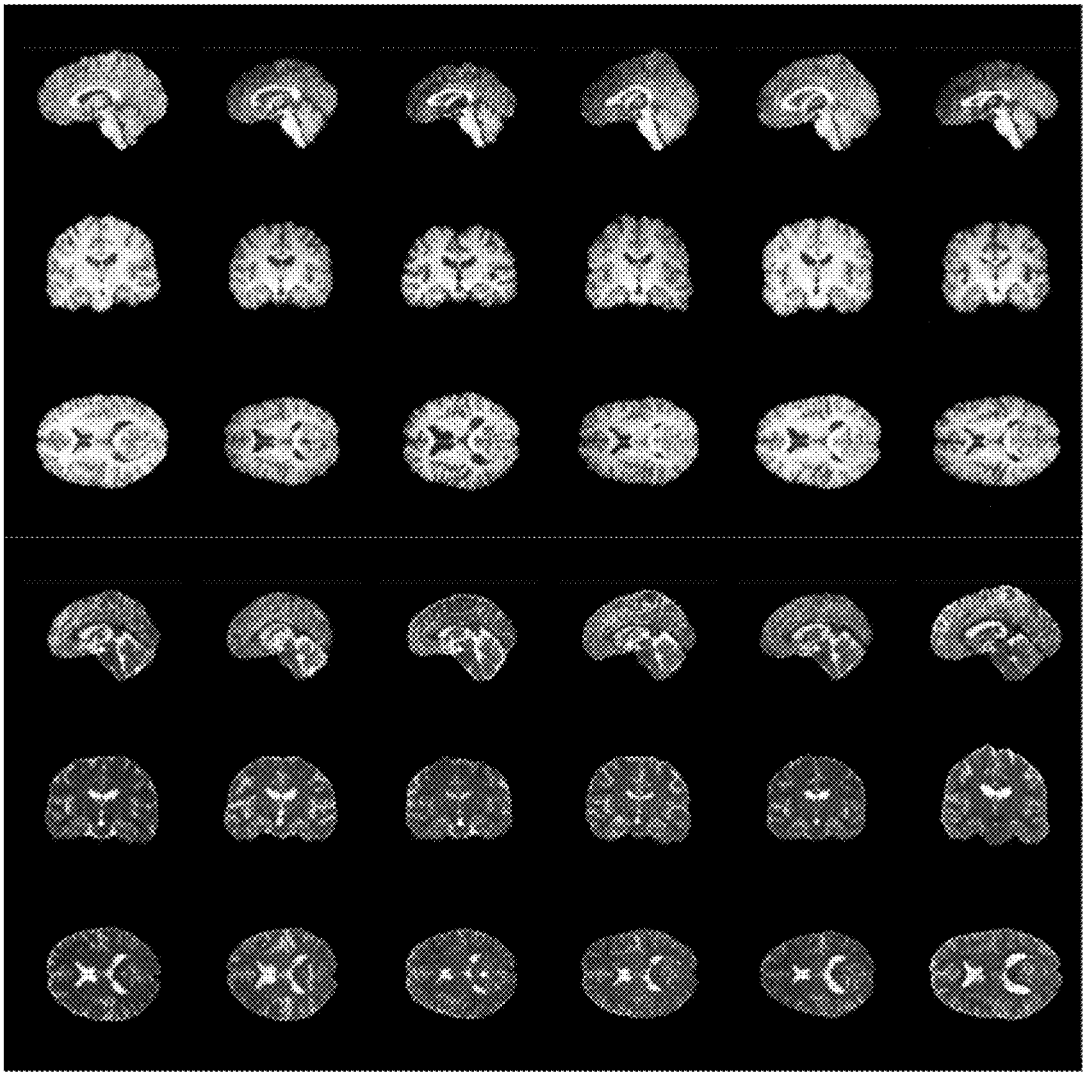
FIG. 9 show two generated examples of healthy 3D brain scans, obtained with the generator described in the third embodiment of the method.

FIG. 9 shows randomly generated healthy brain by the generative model previously described and trained on T1 and T2 MRI brain scans. Generated samples have a high variability, which is represented by a Multi-Scale Structural Similarity (MS-SSIM) metric as low as the one of the training dataset, as shown in Tables 1 and 2.

TABLE 1

| | 3D StyleGAN 2 × 2 × 2 mm Hong et al. | Method trained onT1 3 × 1 × 1 mm | Method trained on T2 3 × 1 × 1 mm |
|---|---|---|---|
| 2D FID score Axial middle slice | 71.3 | 87.0 | 27.8 |
| 2D FID score Coronal middle slice | 90.2 | 16.9 | 6.5 |
| 2D FID score Sagittal middle slice | 106.9 | 31.5 | 27.5 |
| Mean 2D FID score | 89.5 | 45.2 | 20.6 |
| MS-SSIM | 0.93 | 0.86 | 0.81 |

TABLE 2

| | T1 dataset | T2 dataset |
|---|---|---|
| MS-SSIM | 0.86 | 0.82 |

Even though generations of the brainstem and cerebellum are not as detailed as in the real data, the overall quality of the generation stays quite high as it can be seen on Table 1 with a mean Frechet Inception Distance (FID) score of 45.2 for T1, and 20.6 for T2. Table 1 also presents a quantitative comparison of the present model with Hong et al. (Sungmin Hong, Razvan Marinescu, Adrian V. Dalca, Anna K. Bonkhoff, Martin Bretzner, Natalia S. Rost, and Polina Golland. 3D-StyleGAN: A Style-Based Generative Adversarial Network for Generative Modeling of Three-Dimensional Medical Images. In Deep Generative Models MICCAI Workshop, 2021.) work, even if those metrics were not computed on the same dataset, hence not directly comparable. However, to be able to have an objective evaluation, the MS SSIM, as well as the FID score are computed on the training dataset on Table 2.

In terms of generation quality, the present generative model gives better results than the work of Hong et al.

In terms of execution speed, the inference time of present generator is 109±6 ms on average, which is quicker compared to diffusion models. As reconstruction and inpainting methods usually use iterative processes requiring multiple generations to be done, this is a decisive advantage in favor of using a GAN as the generation method.

Regarding the effect of the noise, in the StyleGAN architecture, the noise that is fed in the styleblocks (see B in FIG. 6) is enabling stochastic details during the generation process.

Figure 10:
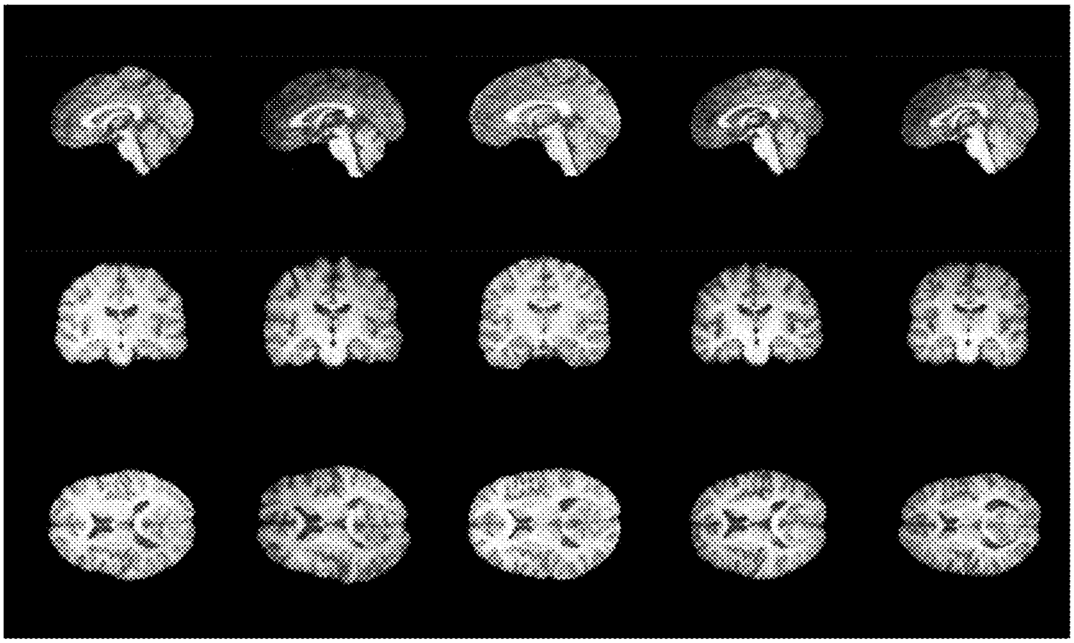
FIG. 10 shows generation example of healthy brain scans without noise obtained with the generator described in the third embodiment of the method.

FIG. 10 represents generation example of healthy brain scans without noise. It can be seen that the samples do not have fine-grained details, only the global structure of the brain is detailed.

Figure 11:
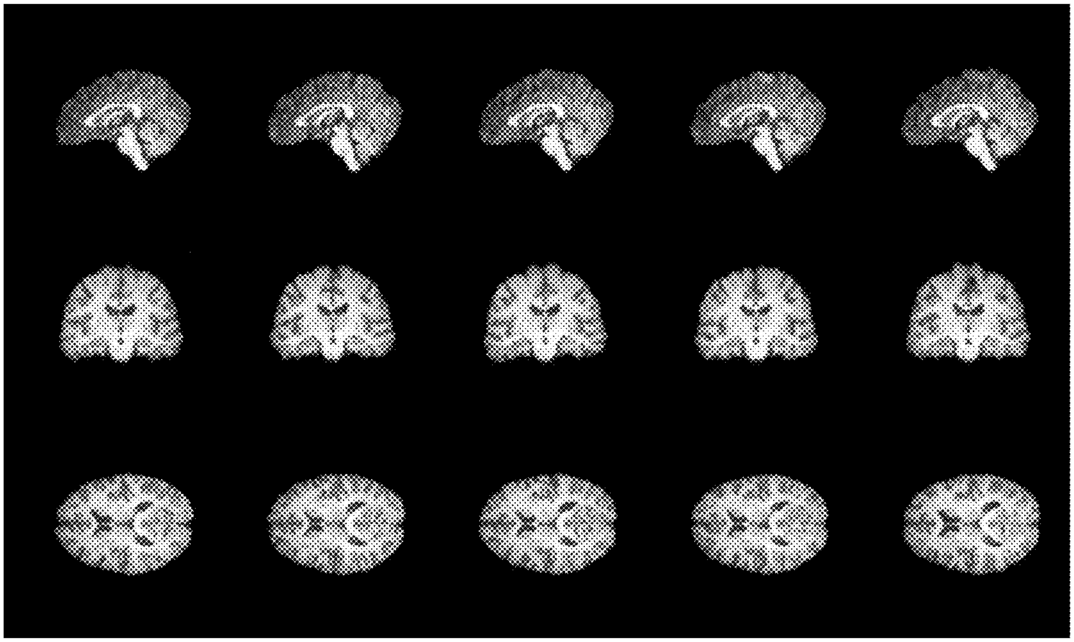
FIG. 11 shows generation example of healthy brain scans with noise from the same latent variable as the one used for FIG. 9, and also obtained with the generator described in the third embodiment of the method.

FIG. 11 represents generation example of healthy brain scans with noise from the same latent variable. Although the brains have the same global structure, local details vary a lot, complex forms of the cortical surface are not the same.

Healthy Brain Reconstruction

To evaluate the realism of the present generated healthy brain scans from MS brain scans, scans from 2398 MS patients from the ADVANCE (NCT00906399) and ASCEND (NCT01416181) trials are used, resulting in 10000 scans for T1 and 2 MRI. Patients all have MS, with lesion activity varying from almost nothing (a few $mm^3$) to more than 100,000 $mm^3$. Those scans are all registered together to a common MNI space, and have a resolution of 3×1×1 $mm^3$. In each T2-w scan, white matter hyper-intensities (WMHs) were delineated by NeuroRX via a semi-automatic method. These delineations are used for the lesions masks.

As stated before, the evaluation of healthy brain reconstruction is a challenging task. A first comparison is made between the apparently healthy tissues of the diseased brain and the synthesized healthy brain scan. Even if MS is a disease where diffuse abnormalities are present in non-lesional 'normal-appearing' brain tissue, the part of the scan that is outside of the WMHs are considered here as healthy tissue. This evaluation is given in Tab. 3, where the Mean Square Error (MSE), the Peak Signal to Noise Ratio (PSNR), and the Structural SIMilarity (SSIM) are computed.

TABLE 3

| | MS brain scans | Healthy brain scans |
|---|---|---|
| MSE | $1.63 \times 10^{-4}$ | $1.66 \times 10^{-4}$ |
| PSNR | 40.4 | 39.8 |
| SSIM | 0.997 | 0.996 |

The MSE is computed between the normalized scans of the healthy reconstruction and the diseased brain on the non-lesion voxels of the brain only. It is a good measure to compare voxel-to-voxel values between scans. SSIM and PSNR are computed between the scans of the healthy reconstruction and the diseased brain replacing lesion voxels by zeros. Those are similarity metrics that take more into account the global perception of the images. As can be seen, the MSE value is below $10^{-3}$ on average, which is extremely good for scans whose values are between 0 and 1. The PSNR values are around 40 dB on average, which is a typical value in lossy image and video compression. That means that data quality is lost during the process, which can indeed be visually seen in FIGS. 12A-12C, where high frequencies of the scans have disappeared.

Figure 12A:
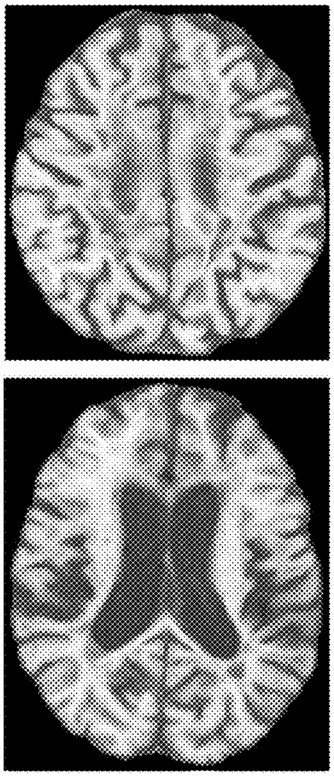
FIGS. 12A to 12C show reconstruction of a healthy brain scan from a multiple sclerosis (MS) brain scan obtained with the third embodiment of the method.
Figure 12B:
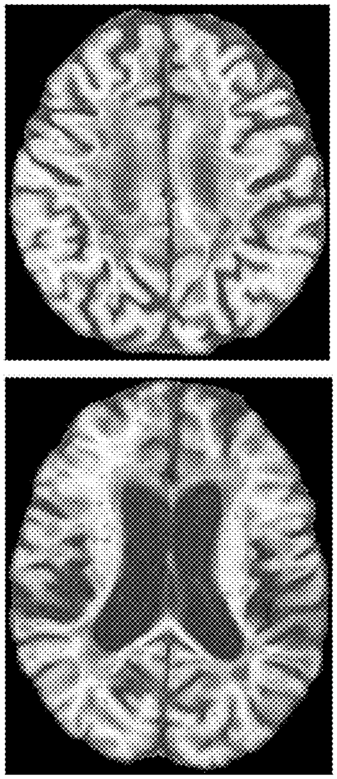
Figure 12C:
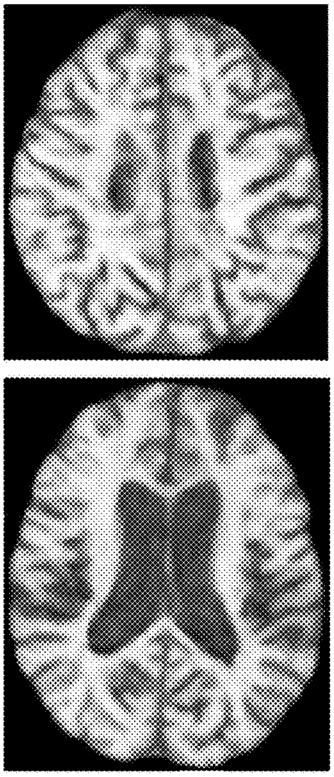

FIG. 12A represents a real MS brand scan. FIG. 12B represents the step of masking the lesions. FIG. 12C represents the healthy reconstruction obtained with the method described above.

Finally, the SSIM values are above 0.995 on average, which describe a high similarity between the reconstructed scans obtained with the method described above (1 being the perfect value).

FIG. 12C shows that the predicted healthy brains are reconstructed very well. The lesions have been removed without generating artifacts, and the healthy tissues appear to match the ones of the diseased brain.

CONCLUSION

This particular example of implementation of the method for generating a 3D image of a human body part, in the case where the human body part is a brain affected by multiple sclerosis (MS), can be generalized to any kind of disease that can be contoured on the diseased brain (for example glioblastoma tumors, other demyelinating, infective or neoplastic conditions, Alzheimer's disease) or another human body part in which the scan presents at least one area altered due to pathology, or a lack of resolution, for example.

The invention claimed is:

1. A computer-implemented method for generating a non-affected 3D image of a human body part of a patient from an affected 3D image of said human body part of said patient, said method comprising:

receiving a trained generative model configured to receive a latent variable as input and to generate a non-affected 3D image as output, wherein said generative model is obtained by training a generative network using a library of human body part 3D scans of reference;

receiving said affected 3D image of a patient comprising at least one portion of said human body part, wherein said affected 3D image comprises at least one affected area;

defining a subset of said affected 3D image by excluding the content of at least one affected area from said affected 3D image;

generating an optimal latent variable from minimizing a distance between said defined subset of the affected 3D image and a candidate subset; wherein said candidate subset is defined by excluding the content of said at least one affected area from a candidate image generated by said generative model fed with a candidate latent variable (S400); wherein the distance is a Euclidean distance calculated over all the voxels of the subset of said affected 3D image and the candidate subset, and wherein regularization terms are added to the Euclidean distance, said regularization terms comprising a cosine similarity prior over the latent variable, a normal distribution prior over the latent variable and a normal distribution prior over noise;

generating a non-affected 3D image of the human body part of said patient with the generative model using said optimal latent variable as input.

2. The method according to claim 1, wherein the generative network is the generator of a generative adversarial network.

3. The method according to claim 2, wherein the generative adversarial network uses 3D convolutions.

4. The method according to claim 1, wherein the latent variable is a latent vector of dimension N and the latent variable is optimized on a mapped space of dimension N of distributions of the vectors used during training.

5. The method according to claim 1, wherein Gaussian noise is added and optimized during generating the optimal latent variable as a second set of latent variables.

6. The method according to claim 1, wherein the regularization terms have each one a contributive weight for the optimization of the latent variable.

7. The method according to claim 6, wherein the contributive weights are defined in a preliminary step (S150) following the training of the generative network.

8. The method according to claim 7, wherein defining the contributive weights comprises:

taking a 3D scan of reference of the human body part;

defining a subset of said 3D scan by excluding an area;

optimizing the latent variable for minimizing a distance between the defined subset and an image of a subset generated by the generative model from the latent variable;

generating a complete 3D image of the studied human body part with the generative model using the optimized latent variable;

comparing the generated complete 3D image with the 3D scan of reference; and reiterating, by modifying the contributive weights, the optimization and the generation steps until the comparison satisfies a predefined criterion.

9. The method according to claim 6, wherein the contributive weights are found by comparing a left, respectively right, half-body part 3D scan with the image of the left, respectively right, half-body part 3D scan generated by the generative model from the right, respectively left, half-body part 3D scan.

10. The method according to claim 1 in which the generative network is trained by using a first library of T1 MRI scans or a second library of T2 MRI scans.

11. The method according to claim 1, wherein the human body part is a brain.

12. The method according to claim 1, wherein said at least one affected area comprises at least one of: a lesion, an artifact, a resolution lower than a predetermined threshold.

13. A device comprising at least one processor configured to carry out a method according to claim 1.

14. A non-transitory computer-readable storage medium comprising instructions which, when executed by a computer, cause the computer to carry out the method of claims 1.

* * * * *